US007715278B2

(12) United States Patent
Lasser et al.

(10) Patent No.: US 7,715,278 B2
(45) Date of Patent: May 11, 2010

(54) INITIATING PLAYING OF DATA USING AN ALARM CLOCK

(75) Inventors: Menahem Lasser, Kochav Yair (IL); Itzhak Pomerantz, Kfar Saba, IL (US)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 12/402,524

(22) Filed: Mar. 12, 2009

(65) Prior Publication Data

US 2009/0175132 A1 Jul. 9, 2009

Related U.S. Application Data

(62) Division of application No. 11/500,320, filed on Aug. 8, 2006.

(60) Provisional application No. 60/706,184, filed on Aug. 8, 2005.

(51) Int. Cl.
*G04B 47/00* (2006.01)
*G04C 21/00* (2006.01)
*H04H 60/27* (2008.01)
*H04B 1/18* (2006.01)

(52) U.S. Cl. .......................... 368/10; 368/73; 368/251; 369/7; 455/186.1

(58) Field of Classification Search .................. 368/10, 368/72-74, 250, 251; 369/6, 7; 455/185.1, 455/186.1

See application file for complete search history.

(56) References Cited

U.S. PATENT DOCUMENTS 5,063,610 A * 11/1991 Alwadish .................... 455/45
5,239,681 A * 8/1993 Parnall et al. ............. 340/7.46
5,671,195 A 9/1997 Lee
5,708,627 A 1/1998 Gormley
5,790,958 A * 8/1998 McCoy et al. ............... 455/557
5,832,067 A 11/1998 Herold
6,021,320 A * 2/2000 Bickford et al. .......... 455/186.1
6,088,455 A * 7/2000 Logan et al. ................ 380/200
6,215,862 B1 4/2001 Lopes
6,411,800 B1 * 6/2002 Emerson, III ............ 455/186.1
6,466,765 B1 10/2002 Tanaka et al.
6,813,776 B2 11/2004 Chernock et al.
6,931,451 B1 * 8/2005 Logan et al. ................ 709/231
7,447,488 B2 * 11/2008 Howard et al. ........... 455/179.1
2002/0147687 A1 10/2002 Breiter et al.

(Continued)

OTHER PUBLICATIONS

U.S. Appl. No. 11/500,320, filed Aug. 2006, Menahem Lassr et al.

(Continued)

*Primary Examiner*—Vit W Miska
(74) *Attorney, Agent, or Firm*—Jenkins, Wilson, Taylor & Hunt, P.A.

(57) ABSTRACT

An alarm clock device includes a monitor for monitoring a transmission of a selected station, a detector for detecting, in the transmission of the selected station, at least one milestone. A controller operating in response to detection of the milestone is provided to store, in a memory, data of the transmission after the milestone was detected, and to initiate playing of the data at a selected wakeup time. According to the present invention, the data is recorded in response to detecting a transmission of a selected station selected from a plurality of stations.

15 Claims, 2 Drawing Sheets

U.S. PATENT DOCUMENTS

| | | | | |
|---|---|---|---|---|
| 2002/0184038 | A1* | 12/2002 | Costello et al. | 704/500 |
| 2002/0186618 | A1 | 12/2002 | Kirkpatrick | |
| 2003/0050024 | A1* | 3/2003 | Fukushima | 455/161.2 |
| 2003/0186661 | A1* | 10/2003 | Fricke et al. | 455/150.1 |
| 2003/0198137 | A1 | 10/2003 | Gorden | |
| 2004/0042103 | A1 | 3/2004 | Mayer | |
| 2004/0110522 | A1* | 6/2004 | Howard et al. | 455/512 |
| 2004/0255330 | A1* | 12/2004 | Logan | 725/115 |
| 2005/0132420 | A1* | 6/2005 | Howard et al. | 725/135 |
| 2005/0146990 | A1 | 7/2005 | Mayer | |
| 2005/0287972 | A1* | 12/2005 | Christensen et al. | 455/186.1 |
| 2006/0067304 | A1* | 3/2006 | McDowall et al. | 370/352 |
| 2006/0268763 | A1* | 11/2006 | George | 370/328 |
| 2007/0010221 | A1* | 1/2007 | Howard et al. | 455/179.1 |
| 2007/0015457 | A1* | 1/2007 | Krampf et al. | 455/3.06 |
| 2007/0030765 | A1 | 2/2007 | Lasser et al. | |

OTHER PUBLICATIONS

Final Official Action for U.S. Appl. No. 11/500,320 (Oct. 5, 2009).
Official Action for U.S. Appl. No. 11/500,320 (Dec. 29, 2008).
Report on Characterization of Generic Audio Signals., From AVIR Project—Espirit 28798 (Sep. 16, 1999).

* cited by examiner

INITIATING PLAYING OF DATA USING AN ALARM CLOCK

CROSS-REFERENCE TO RELATED APPLICATIONS

This application is a divisional of U.S. patent application Ser. No. 11/500,320, filed Aug. 8, 2006, which claims the benefit of U.S. Provisional Patent Application No. 60/706,184, filed Aug. 8, 2005.

FIELD OF THE INVENTION

The present invention relates to an alarm clock device that is set to play data content of a station defined by a user.

BACKGROUND OF THE INVENTION

Electronic alarm clocks are well known in the art. An alarm clock is typically set to produce a loud sound at a certain time in order to wake up a user.

Some alarm clocks are implemented to switch on a built-in radio and use the audio sound of the radio as a wakeup sound. These alarm clocks allow the user to select the radio station and volume.

A user typically has preferences regarding the audio content that is played in his or her ears. These preferences are the reason that he or she will prefer one radio station over another. Moreover, the user's preferences extend to specific content of the selected radio station. By way of example, the user may prefer to hear the beginning of the most recent news program on the selected station, rather then the real-time content that is broadcast when he wakes up.

The ability to buffer and store streaming data, and the ability to play them with a delay, is well known in the art and is taught by US Patent Application No. 20040042103 to Mayer, which is incorporated by reference for all purposes as if fully set forth herein. The Mayer patent application relates to retroactive recording and/or replaying events after such events have been broadcasted and also to a situation of switching between channels.

However, the only way for a user to wake to a broadcasted event, such as the beginning of a news program, using prior art alarm clocks is to set the wake up time of the alarm clock to the exact time in which this event is broadcasted.

SUMMARY OF THE INVENTION

Accordingly, it is a principal object of the present invention to overcome the disadvantages of prior art systems by introducing an innovative system set to automatically play delayed audio content at any wakeup time.

With respect to the present invention, a milestone (such as a time-dependant event defining a certain time point an event in the audio stream indicating the starting point of the audio data, etc.) in a transmission of a given station (e.g. radio station) is defined as an event that can be detected by the alarm clock of the present invention using user-defined criteria. The detection of a milestone in a transmission of a radio station triggers the alarm clock to record audio data of the corresponding event.

In accordance with the present invention, there is provided an alarm clock device including: (a) a monitor for monitoring a transmission of a selected station, the selected station selected from a plurality of stations; (b) a detector for detecting, in the transmission of the selected station, at least one milestone; (c) a memory; and (d) a controller operative, in response to detection of the milestone, to record, in the memory, data of the transmission in which the milestone was detected, and to initiate playing of the data at a selected wakeup time.

Preferably, at least one of the stations is a radio station.

Preferably, the controller is also operative to initiate playing of real-time audio content.

Preferably, the milestone includes a time-dependent event. Alternatively, the milestone includes a detectable event, such as a voice pattern, a pre-defined period of silence, a pre-defined sound, etc.

Preferably, the milestone includes a recurring milestone in the transmission of the selected station. More preferably, the controller, having stored the data in response to a detection of a preceding recurring milestone in the transmission of the selected station, is operative to replace the data with new data upon a detection of a new recurring milestone.

Preferably, the memory is operative to store at least 1 megabyte of data. More preferably, the memory is operative to store at least 10 megabyte of data. Most preferably, the memory is operative to store at least 50 megabyte of data.

In accordance with the present invention, there is further provided a method for using an alarm clock, the method including the steps of: (a) setting the alarm clock on a selected station that is selected from a plurality of stations; (b) defining, for the selected station, at least one milestone; (c) in response to detecting the milestone in a transmission of the selected station, recording data of the transmission of the selected station; and (d) initiating playing of the recorded data at a selected wakeup time.

Preferably, the playing includes playing real-time data.

Preferably, the milestone includes a time-dependant event. Alternatively, the milestone includes a detectable event, such as a voice pattern, a pre-defined period of silence, a pre-defined sound, etc.

Preferably, the stations include at least one radio station.

Preferably, the milestone includes a recurring milestone in the transmission of the selected station. More preferably, the recording step includes the step of replacing data, recorded in response to detecting a preceding recurring milestone, with new data.

In accordance with the present invention, there is further provided an alarm clock device including: (a) a receiver for receiving a transmission of a selected station; (b) a memory; and (c) a controller operative, upon detection of a selected recording time, to record, in the memory, data of the transmission, and to initiate playing of the data at a selected wakeup time.

Preferably, the selected station is a radio station.

Preferably, the controller is also operative to initiate playing of real-time audio content.

Preferably, the memory is operative to store at least 1 megabyte of data. More preferably, the memory is operative to store at least 10 megabyte of data. Most preferably, the memory is operative to store at least 50 megabyte of data.

In accordance with the present invention, there is further provided a method for using an alarm clock, the method including the steps of: (a) receiving a transmission of a selected station; (b) defining a selected recording time and a selected wakeup time; (c) upon detecting the selected recording time, recording data of the transmission of the selected station; and (d) initiating playing the recorded data at the selected wakeup time.

Preferably, the playing includes playing real-time data.

Preferably, the selected station is a radio station.

Additional features and advantages of the invention will become apparent from the following drawings and description.

BRIEF DESCRIPTION OF THE DRAWINGS

For a better understanding of the invention with regard to the embodiment thereof, reference is made to the accompanying drawings, in which like numerals designate corresponding sections or elements throughout, and in which.

DETAILED DESCRIPTION OF THE PREFERRED EMBODIMENTS

Figure 1:
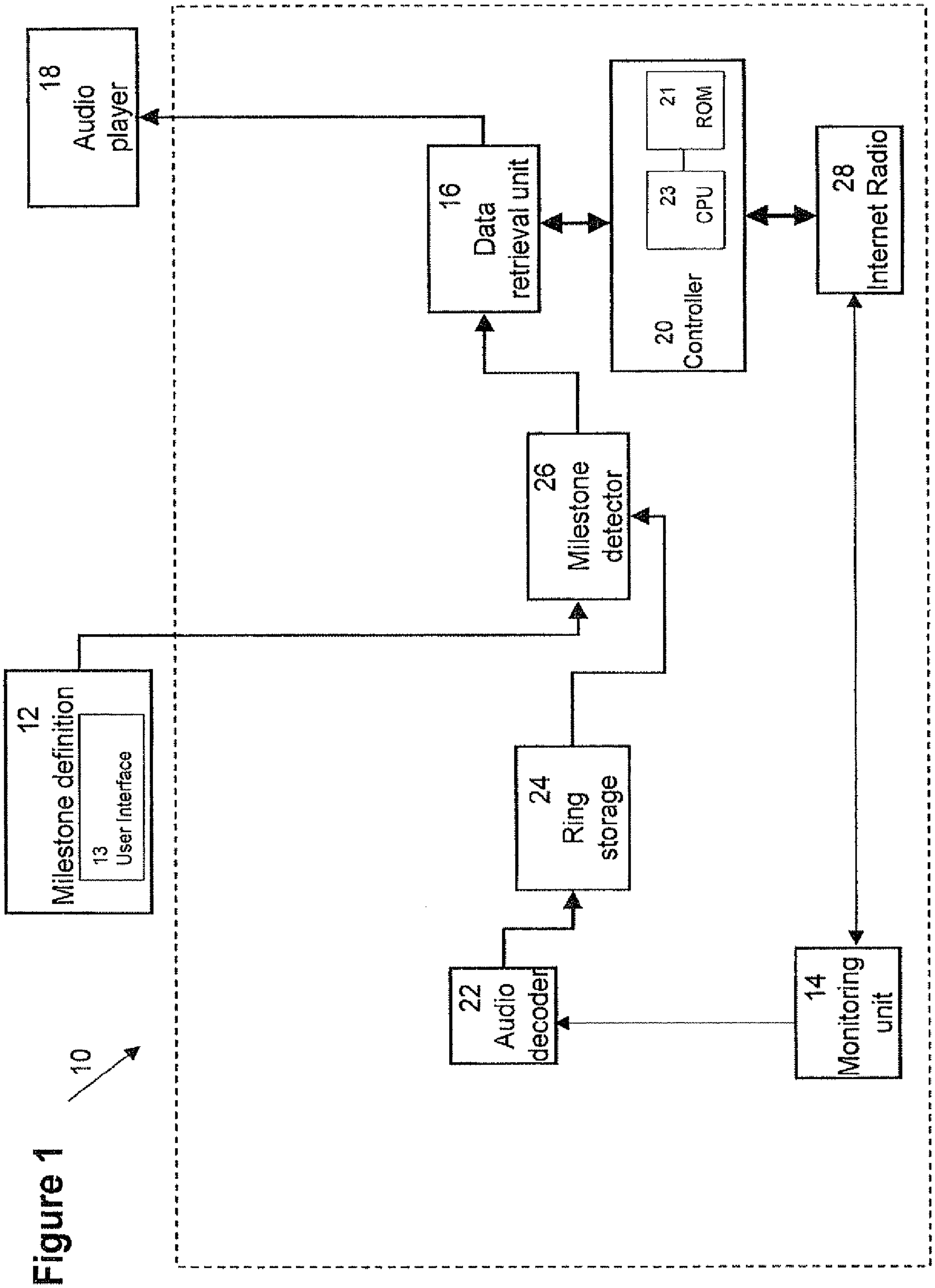
FIG. 1 is a block diagram of an alarm clock of the present invention.

The present invention is an alarm clock that is set by a user to initiate playing of audio data of a selected station at a wakeup time in response to a milestone that is pre-defined by the user for the selected station. The audio data played by the alarm clock is either previously recorded data or realtime data.

With respect to the present invention, a milestone in a transmission of a given station (e.g. radio station) is defined as an event that can be detected by the alarm clock of the present invention using user-defined criteria. The detection of a milestone in a transmission of a radio station triggers the alarm clock to record audio data of the corresponding event.

Optionally, the milestone is a recurring milestone that can be detected a plurality of times, so that data received as a result of detecting a first recurrent milestone in transmissions of a desired radio station is updated with new data received as a result of detecting a second recurrent milestone. The exact timing of the most recent detected milestone is noted in the alarm clock until a subsequent milestone is detected and the new audio content is updated.

Milestones can be, by way of example, time-dependant events defining a certain time point (e.g. a specified time of a specified day of the week for hearing a weekly economic report, a round hour for hearing the news). Alternatively, milestones can be any event in the audio stream indicating the starting point of the audio data, such as the beginning of a musical item, the appearance of a defined audio sound (a program identification sound), etc.

By way of example, the user sets the wakeup time to 07:20 o'clock and selects a station that has a news program at 07:00 o'clock, such that the milestone for this station is defined to be the time 07:00. In such a case, the alarm clock is set to wake the user at 07:20 while playing the 7 o'clock news from the beginning.

It is optional to configure the alarm clock to accumulate a limited amount of content, such that if the user asks for a too long delay between the detection of a milestone and the wakeup time, a warning sign is given to the user indicating that the user is asking for too long a delay. Alternatively, the alarm clock plays only a pre-determined amount of delayed content (typically determined by the amount of available storage capacity) and then automatically switches to "real time" mode to play audio content currently broadcasted.

By way of another example, the user may set the alarm clock on a station that has a news program every hour, on the hour. The milestone for this station may be defined by the user to be the round hour before the time for which the wakeup time is set. In such a case, whenever the alarm clock is set to wake the user, the alarm clock will play the most recent broadcasted news program from the beginning.

By way of yet another example, the user may select a station that continuously plays classical music and set the milestone to the instance the classical music is stopped playing and a person is speaking. Whenever the alarm clock is set to wake the user, the user will hear the announcement of the last broadcasted musical piece followed by the musical piece itself.

The distinction between a human voice and instrumental music by processing audio signals of a monitored radio station for allowing to set a milestone to the moment music is replaced by a human voice is done using pattern recognition methods known in the art. See for example, *Report on Characterization of Generic Audio Signals*, available on request from the AVIR (Audio-visual Indexing and Retrieval) Project, ESPRIT 28798), which is a collaborative effort of several companies to create an Audio-Visual Indexing and Retrieval (AVIR) solution, allowing common users to easily access, store and retrieve relevant audio-visual information from the vast amounts of resources at their disposal, e.g. through the next generation of multimedia-connected television systems. This report is incorporated by reference for all purposes as if fully set forth herein.

The alarm clock of the present invention is implemented to continuously monitor transmissions of a desired station for detecting milestones. As such, the alarm clock includes a conventional over-the-air receiving device. Alternatively, the alarm clock includes an Internet radio.

The term "Internet radio" is used in the sense of a network-based or an Internet-based receiving device that extracts the audio signal from packets of a protocol such as TCP-IP. The Internet radio is connected to the Internet via a connection, such as a LAN (Local Area Network) connection, a wireless connection or a broad band telephone connection. In such case, the term "station" means a web site that delivers streaming audio data of a selected radio station.

The Internet radio that is disclosed herein can tune to a very large number of radio stations, by digitally processing a stream of audio content via a network connection. This technology, such as the Philips Internet Radio Mini Shelf Stereo—#FWI-1000, available from Koninklijke Philips Electronics N.V. of Amsterdam, The Netherlands, is well known in the art.

Referring now to FIG. 1, there is shown a block diagram of an alarm clock 10 of the present invention. Alarm clock 10 includes an Internet-radio 28 that is connected to the Internet via a LAN (Local Area Network), a wireless connection or a broad band telephone connection for example.

Alarm clock 10 is set, via a User Interface 13, to initiate playing content stream of a selected radio station at a selected wakeup time in response to a pre-defined milestone. Alarm clock 10 can be set to operate on either in "real time" mode (to initiate playing of real-time audio data) or in "milestone" mode (to initiate playing of previously recorded audio data).

Monitoring unit 14 is provided to continuously monitor transmissions of the selected station that are received from Internet-radio 28 and to detect the pre-defined milestone.

The milestone is defined by the user using a Milestone setting unit 12 by operating a User Interface unit 13. The user can select the desired milestone item from among a plurality of alternative milestones by manipulating operational buttons of User Interface unit 13. Alternatively, the user can select the desired milestone by touching a touch-screen of a menu displaying, at a desired location, a plurality of alternative milestones on the User Interface unit 13.

By way of example, preferred milestones include a predefined time value, a round hour, a pronunciation of the phrase “enjoy it!” (which, when the present invention becomes popular, may become a standard phrase of presenters to define events that listeners can designate as milestones), an appearance of a specific audio clip (which is used by a specific radio station to mark the separation between programs), 3 seconds of continuous silence that are followed by resumption of audio, etc.

Since the audio data is continuously refreshed and updated (by controller 20), alarm clock 10 triggers recoding over what was recorded in a previous milestone (except when the milestone is newly defined). Therefore, the preferred milestones listed herein above are an indication of the most recent round hour, the most recent pronunciation of the phrase “enjoy it!”, the most recent appearance of 3 seconds of continuous silence, etc.

The content stream of the selected radio station is decoded via audio data using an audio decoder unit 22. The decoded audio data is then stored in a ring storage unit 24 that is operative to store a given amount of data (such as audio data) according to a pre-defined capacity. Optionally, the data stored in the ring storage unit 24 is stored in a compressed manner to save storage area.

A controller 20 includes a CPU 23 and ROM (Read-Only Memory) 21 embedded within for storing the code executed by the CPU. Controller 20 is provided to automatically refresh and update audio data stored in the ring storage unit 24 by erasing the old data and making room for new monitored data.

A milestone detector unit 26 receives the milestone setting and the audio data of the selected radio station to detect a relevant milestone occurrence.

Optionally, the recognition of the text of specific spoken phrases can be done using speech recognition methods known in the art, such as the “via voice” program of International Business Machines Corp., Armonk N.Y. USA and the “voice dialing” products of Advanced Recognition Technologies, Tel-Aviv Israel.

The audio data of the selected radio station are retrieved via a Data retrieval unit 16. An Audio player 18 is provided to play the retrieved audio data at the selected wakeup time.

Implementing the alarm clock of the present invention to function as a radio system, which continuously monitors a plurality radio stations via Monitoring unit 14, is optional. The detection of a milestone in each monitored radio station triggers the recording of respective data. Hence, upon tuning to the desired radio station, the radio system is set to play the previously recorded data.

Figure 2:
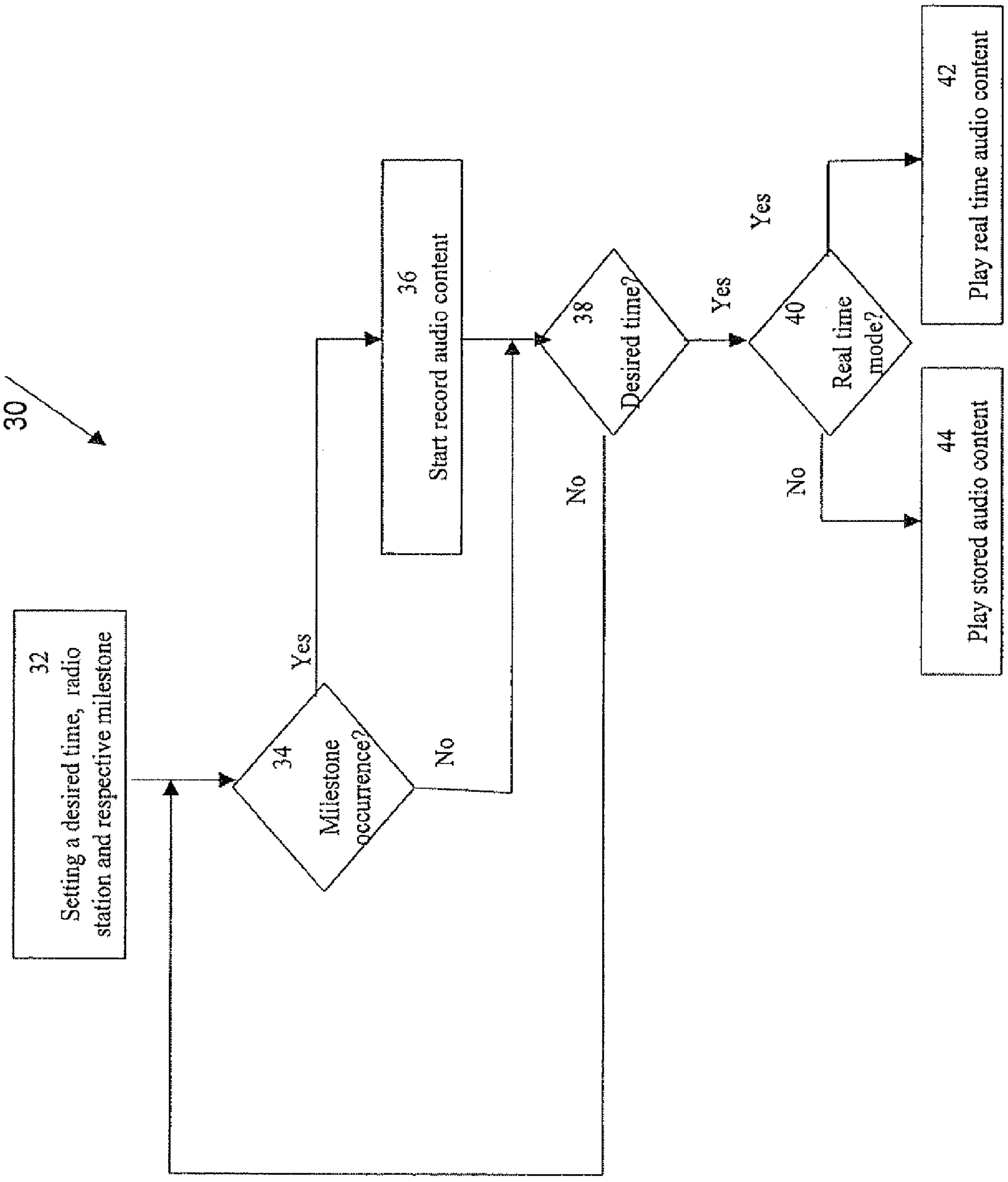
FIG. 2 is a flowchart of a method of the present invention for pre-programming the alarm clock of FIG. 1 to play desired audio content.

Referring to FIG. 2, there is shown a flowchart 30 of the method of the present invention.

At the initial step 32, a desired time (wake up time, for example), a desired radio station and a milestone for this radio station are defined by a user. By way of example, the desired time can be set to 07:20, the desired radio station can be set to “BBC Middle East” and the milestone for this radio station can be set to “Two minutes before a round hour”. In the case of this example, the milestone is time-dependent. In another example, the milestone can be content dependent, such as “The beginning of a musical item” Alternatively, a milestone can be defined to be a function of both the time and the content. The alarm clock of the present invention then continuously monitors the desired radio station to detect a relevant milestone (step 34 to step 38).

At step 34, it is determined whether a relevant milestone is detected. In the affirmative case, the method proceeds to step 36, for starting to record the most current audio data decoded from the streaming content of this desired radio station with respect to the detected milestone. However in the negative case, step 36 is skipped.

At the next step 38, it is verified whether the wakeup time has arrived. Note that the audio data from the corresponding streaming content is recorded even after the desired time has arrived. For example, if a user whishes to wake up at 7:05 to the 7:00 o’clock news, he/she can listen to the 7:00 o’clock news for half-an-hour with a 5 minute time delay.

In the negative case (i.e. if the desired time has not arrived), the method returns to step 34 in order to detect the next milestone. However in the affirmative case, the method proceeds to step 40.

At step 40, it is determined by the controller 20 (see FIG. 1) whether the alarm clock is set to play on “real time” mode or on “milestone” mode. In case the alarm clock is set on “real time mode”, step 42, then the alarm clock tunes to play audio data currently broadcasted at this desired radio station. In case the alarm clock is set on “milestone mode”, step 44, then the audio data played by the alarm clock is the audio data recorded in block 36 in response to the most recent detected milestone. Preferably, the default setting of the alarm clock is on “real time” mode in case no milestone was detected.

Another way to use the alarm clock of the present invention is by switching from “milestone” mode to “real time” mode without changing the selected radio station. Hence, at the time the user switched to “real time” mode audio content currently broadcasted at this radio station is played (disregarding any audio data previously recorded for this radio station). Meanwhile (during the time interval a milestone is being monitored at this radio station), the radio system continues to record the audio content to support switching back to “milestone” mode.

The alarm clock of the present invention requires a very large storage space for storing hours of audio content that can amount to tens of megabytes of audio data (e.g. 10 Mb, 50 Mb, etc.). Such amount of storage space can be provided by employing a flash memory device such as the “Disk on Chip” product, available from M-Systems, Kefar Sava, Israel.

It should be also understood that the proposed alarm clock disclosed herein may employ any type of memory device, e.g. NAND-type flash memory device, hard disk, etc. Furthermore, other implementations are possible within the scope of the invention, thus relating to any system, such as a television and a video, implemented to automatically initiate playing of delayed digital content (such as audio content or video content) at any setup time.

Having described the invention with regard to certain specific embodiments thereof, it is to be understood that the description is not meant as a limitation, since further modifications will now suggest themselves to those skilled in the art and it is intended to cover such modifications as fall within the scope of the appended claims.

The invention claimed is:

1. An alarm clock device comprising:

(a) a monitor for monitoring a transmission of a selected station, said selected station selected from a plurality of stations;

(b) a detector for detecting, in said transmission of said selected station, at least one milestone that includes a detectable event selected from the group consisting of a voice pattern, a pre-defined period of silence and a pre-defined sound;

(c) a memory; and (d) a controller operative, in response to detection of said at least one milestone, to record, in said memory, data of said transmission in which said at least one milestone was detected, and to initiate playing of said data at a selected wakeup time.

2. The alarm clock device of claim 1, wherein at least one of said plurality of stations is a radio station.

3. The alarm clock device of claim 1, wherein said controller is also operative to initiate playing of real-time audio content.

4. The alarm clock device of claim 1, wherein said at least one milestone includes a time-dependent event.

5. The alarm clock device of claim 1, wherein said at least one milestone includes a recurring milestone in said transmission of said selected station.

6. The alarm clock device of claim 5, wherein said controller, having stored said data in response to a detection of a preceding said recurring milestone in said transmission of said selected station, is operative to replace, upon a detection of a new said recurring milestone, said data with new data.

7. The alarm clock device of claim 1, wherein said memory is operative to store at least 1 megabyte of said data.

8. The alarm clock device of claim 7, wherein said memory is operative to store at least 10 megabyte of said data.

9. The alarm clock device of claim 8, wherein said memory is operative to store at least 50 megabyte of said data.

10. A method for using an alarm clock, the method comprising the steps of:

(a) setting the alarm clock on a selected station, selected from a plurality of stations;

(b) defining, for said selected station, at least one milestone that includes a detectable event selected from the group consisting of a voice pattern, a pre-defined period of silence and a pre-defined sound;

(c) in response to detecting said at least one milestone in a transmission of said selected station, recording data of said transmission of said selected station; and (d) initiating playing of said recorded data at a selected wakeup time.

11. The method of claim 10, wherein said playing includes playing real-time data.

12. The method of claim 10, wherein said at least one milestone includes a time-dependent event.

13. The method of claim 10, wherein said plurality of stations include at least one radio station.

14. The method of claim 10, wherein said at least one milestone includes a recurring milestone in said transmission of said selected station.

15. The method of claim 14, wherein said recording step includes the step of replacing said data, recorded in response to detecting a preceding said recurring milestone, with new data.

* * * * *